(12) United States Patent
Matsubara

(10) Patent No.: US 7,929,996 B2
(45) Date of Patent: Apr. 19, 2011

(54) ELECTRONIC DEVICE SYSTEM, ELECTRONIC DEVICE, DISPLAY DEVICE, AND COMMUNICATION CONTROL METHOD OF ELECTRONIC DEVICE SYSTEM

(75) Inventor: Shinzo Matsubara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 798 days.

(21) Appl. No.: 11/528,428

(22) Filed: Sep. 28, 2006

(65) Prior Publication Data
US 2007/0123163 A1 May 31, 2007

(30) Foreign Application Priority Data
Sep. 29, 2005 (JP) ................ P2005-283640

(51) Int. Cl.
*H04B 1/38* (2006.01)
(52) U.S. Cl. ..... 455/566; 455/145; 455/557; 455/556.1; 455/344
(58) Field of Classification Search .................. 455/566, 455/151.2, 153.2, 145, 154.2, 158.4, 158.5, 455/575.1, 550.1, 557, 186.1, 422.1, 556.1, 455/85, 344, 146; 345/156; 709/222; 379/16, 379/17, 102.02, 100.02, 100.12
See application file for complete search history.

(56) References Cited

U.S. PATENT DOCUMENTS

| | | | |
|---|---|---|---|
| 2002/0080753 A1 | 6/2002 | Lee | |
| 2002/0147819 A1 | 10/2002 | Miyakoshi et al. | |
| 2003/0126620 A1 | 7/2003 | Hayakawa | |
| 2003/0202006 A1* | 10/2003 | Callway | 345/719 |
| 2004/0198430 A1* | 10/2004 | Moriyama et al. | 455/556.1 |
| 2006/0019666 A1* | 1/2006 | Tell et al. | 455/445 |

FOREIGN PATENT DOCUMENTS

| | | |
|---|---|---|
| JP | 61-251280 | 11/1986 |
| JP | 2002-359623 | 12/2002 |
| JP | 2004-356855 | 12/2004 |
| JP | 2005-175814 | 6/2005 |
| WO | WO 2005/078990 A1 | 8/2005 |
| WO | WO 2005/079016 A1 | 8/2005 |

OTHER PUBLICATIONS

European Search Report and Communication issued by the European Patent Office on Feb. 5, 2007, for European Patent Application No. 06121385.6.
Notification of Reasons for Refusal issued by the Japanese Patent Office on Dec. 14, 2010, for Japanese Patent Application No. 2005-283640, and English-language translation thereof.

* cited by examiner

*Primary Examiner* — Dominic E Rego
(74) *Attorney, Agent, or Firm* — Finnegan, Henderson, Farabow, Garrett & Dunner, L.L.P.

(57) ABSTRACT

According to one embodiment, an electronic device includes: a detection unit which detects whether the display device is attached to the electronic device; a wireless communication unit capable of simultaneously advancing information communication via wireless communication channel with a plurality of parties containing transmission of video information to the display device; a wired communication unit which transmits video information to the display device via a wired communication channel when the detection unit detects that the display device is attached to the electronic device; a acquisition unit acquires the device information assigned to the display device via the wired communication channel from the display device when the detection unit detects that the display device is attached to the electronic device; and a communication control unit which controlling the wireless communication unit to preferentially conduct information communication addressed to the device information acquired by the acquisition unit.

12 Claims, 6 Drawing Sheets

ELECTRONIC DEVICE SYSTEM, ELECTRONIC DEVICE, DISPLAY DEVICE, AND COMMUNICATION CONTROL METHOD OF ELECTRONIC DEVICE SYSTEM

CROSS-REFERENCE TO RELATED APPLICATIONS

This application is based upon and claims the benefit of priority from Japanese Patent Application No. 2005-283640, filed on Sep. 29, 2005, the entire contents of which are incorporated herein by reference.

BACKGROUND

1. Field

One embodiment of the invention relates to an electronic device system including a display device and an electronic device to and from which the display device can be attached and detached.

2. Description of the Related Art

In recent years, a wireless LAN (Local Area Network) has spread quickly, and it has been a widely common practice to connect electronic devices in a cableless manner in a home as well as in an office.

For example, a TV system wherein a display device and a tuner box are separated and can be attached and detached is available. It is disclosed by, for example, Japanese Patent Application Publication (KOKAI) No. Sho 61-251280. In such a system, Connecting the display device and the tuner box in a cableless manner starts.

A recent tuner box has grown and expanded in functionality; many tuner boxes are provided with a function as a receptacle for connecting to the Internet, etc., in a cableless manner, for example, in addition to a function of inputting TV broadcast information received at an antenna and generating video information. That is, the multifunctional tuner box allows wireless communication with a display device for displaying TV broadcast video and wireless communication with a personal computer for the user to view a Web page, etc., on the Internet to proceed simultaneously.

When communication through a wireless LAN is conducted, priority can be given to each piece of information to be transmitted, namely, priority control can be performed, by using a technique called WMM (WiFi MultiMedia). Therefore, as the WMM function is installed, a high priority can be assigned to transmission of video information to the display device requiring the immediacy.

However, to execute the priority control, the WMM function must be installed in both the tuner box and the display device. It also becomes necessary to change the application program to add the priority giving procedure. Thus, if software of the wireless LAN is compatible with the WMM, for example, the application program is incompatible with the WMM and thus the most of the priority control is not sufficiently made under the current circumstances.

BRIEF DESCRIPTION OF THE SEVERAL VIES OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
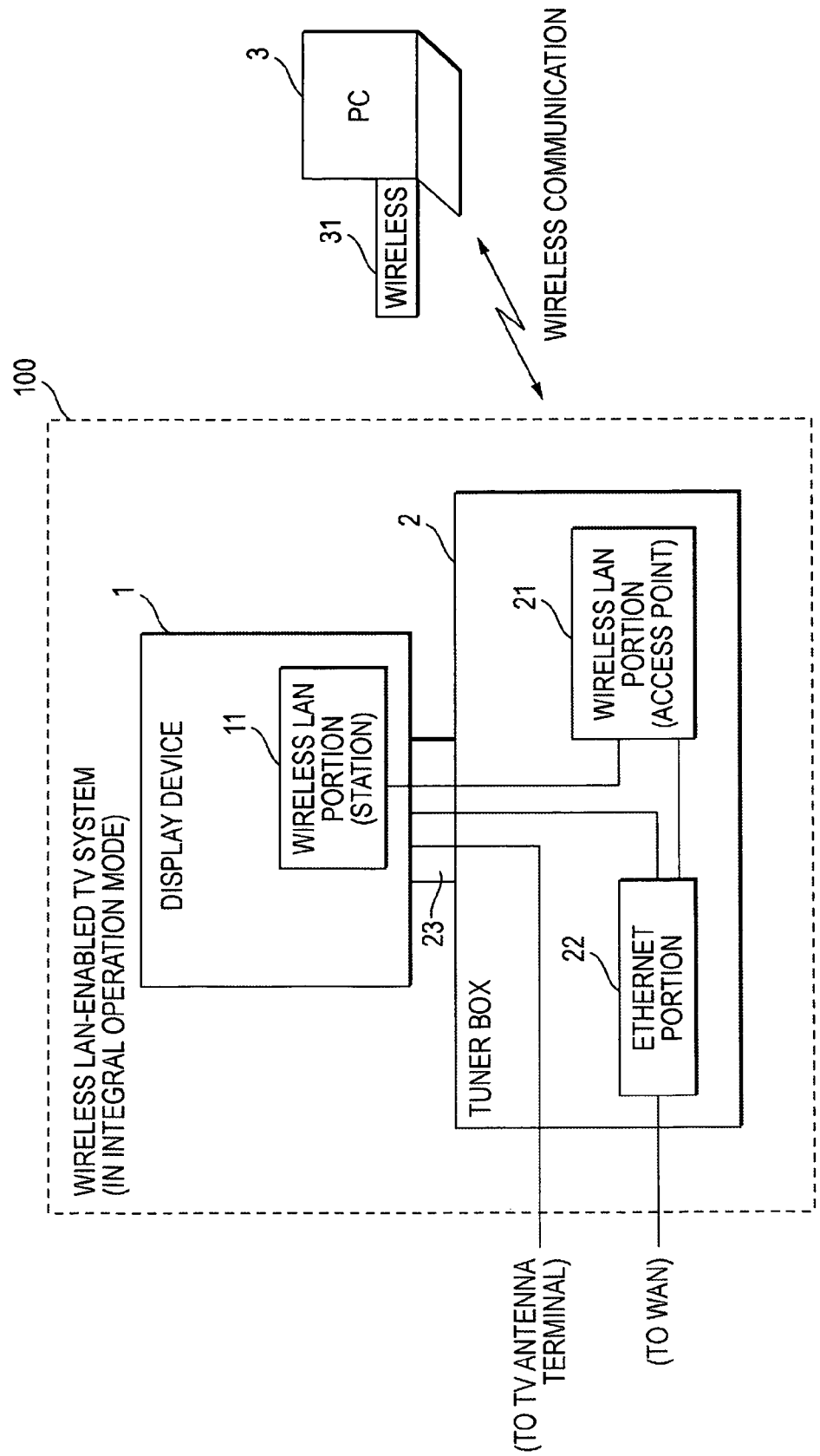
FIG. 1 is an exemplary diagram showing a first use example of a wireless LAN-enabled TV system according to an embodiment of the invention (in integral operation mode)

Various embodiments according to the invention will be described hereinafter with reference to the accompanying drawings.

In general, according to one embodiment of the invention, an electronic device system comprises: a display device; and an electronic device to and from which the display device can be attached and detached, wherein the display device includes: a first detection unit which detects whether the display device is attached to the electronic device; a first wireless communication unit which receives video information from the electronic device via a wireless communication channel when the first detection unit detects that the display device is detached from the electronic device; a first wired communication unit which receives video information from the electronic device via a wired communication channel of which the connection is made during the display device is attached to the electronic device, when the first detection unit detects that the display device is attached to the electronic device; and a control unit which transmits device information assigned to the first wireless communication unit via the wired communication channel when the first detection unit detects that the display device is attached to the electronic device, wherein the electronic device includes: a second detection unit which detects whether the display device is attached to the electronic device; a second wireless communication unit capable of simultaneously advancing information communication via wireless communication channel with a plurality of parties containing transmission of video information to the display device; a second wired communication unit which transmits video information to the display device via the wired communication channel when the second detection unit detects that the display device is attached to the electronic device; an acquisition unit which acquires the device information assigned to the first wireless communication unit via the wired communication channel from the display device when the second detection unit detects that the display device is attached to the electronic device; and a communication control unit which controls the second wireless communication unit to preferentially conduct information communication addressed to the device information acquired by the acquisition unit.

Further, according to one embodiment of the invention, an electronic device system comprises: a display device; and an electronic device to and from which the display device can be attached and detached, wherein the display device includes: a first detection unit which detects whether the display device is attached to the electronic device; a first wireless communication unit which receives video information from the electronic device via a wireless communication channel when the first detection unit detects that the display device is detached from the electronic device; and a first wired communication unit which receives video information from the electronic device via a wired communication channel of which the connection is made during the display device is attached to the electronic device, when the first detection unit detects that the display device is attached to the electronic device, wherein the electronic device includes: a second detection unit which detects whether the display device is attached to the electronic device; a second wireless communication unit which transmits video information to the display device via the wireless communication channel when the second detection unit detects that the display device is detached from the electronic device; and a second wired communication unit which transmits video information to the display device via the wired communication channel when the second detection unit detects that the display device is attached to the electronic device.

Further, according to one embodiment of the invention, an electronic device to and from which a display device can be attached and detached, the electronic device comprising: a detection unit which detects whether the display device is attached to the electronic device; a wireless communication unit capable of simultaneously advancing information communication via wireless communication channel with a plurality of parties containing transmission of video information to the display device; a wired communication unit which transmits video information to the display device via a wired communication channel when the detection unit detects that the display device is attached to the electronic device; a acquisition unit acquires the device information assigned to the display device via the wired communication channel from the display device when the detection unit detects that the display device is attached to the electronic device; and a communication control unit which controlling the wireless communication unit to preferentially conduct information communication addressed to the device information acquired by the acquisition unit.

Further, according to one embodiment of the invention, a display device that can be attached to and detached from an electronic device, the display device comprises: a detection unit which detects whether the display device is attached to the electronic device; a wireless communication unit which receives video information from the electronic device via a wireless communication channel when the detection unit detects that the display device is detached from the electronic device; a wired communication unit which receives video information from the electronic device via a wired communication channel of which the connection is made during the display device is attached to the electronic device, when the detection unit detects that the display device is attached to the electronic device; and a control unit which transmits device information assigned to the wireless communication unit via the wired communication channel when the detection unit detects that the display device is attached to the electronic device.

Further, according to one embodiment of the invention, a communication control method of an electronic device system comprising a display device and an electronic device to and from which the display device can be attached and detached, the method comprises: detecting at the display device whether the display device is attached to the electronic device; transmitting device information, assigned to the display device, from the display device to the electronic device via a wired communication channel of which the connection is made during the display device is attached to the electronic device, when it is detected that the display device is attached to the electronic device; detecting at the electronic device whether the display device is attached to the electronic device; acquiring the device information assigned to the display device via the wired communication channel from the display device when it is detected that the display device is attached to the electronic device; and controlling information communication via a wireless communication channel to preferentially conduct information communication addressed to the acquired device information.

As described above, according to one embodiment of the invention, there is provided an electronic device system, an electronic device, a display device, and a communication control method of the electronic device system to give a higher priority to wireless communication between the display device and the electronic device (tuner box) as the user performs only simple work.

FIG. 1 is an exemplary diagram showing a first use example of a wireless LAN-enabled TV system according to an embodiment of the invention (in integral operation mode).

A wireless LAN-enabled TV system 100 includes a display device 1 and a tuner box 2 to and from which the display device 1 can be attached and detached, as shown in FIG. 1. In the first use example shown in FIG. 1, the display device 1 is attached to the tuner box 2 for physical connection thereof to operate in the integral operation mode. In this case, information communication from the tuner box 2 to the display device 1 are executed through a wired communication channel of which the connection is made via a connector 23.

The tuner box 2 is provided with a function, e.g., as a receptacle for connecting to a WAN (Wide Area Network) such as the Internet in a cableless manner, in addition to a function of generating video information from TV broadcast information captured from a TV antenna terminal and transmitting the video information to the display device 1. Thus, the tuner box 2 has a wireless LAN portion 21 and an Ethernet (registered trademark) portion 22. A personal computer (PC) 3 in FIG. 1 is an electronic device for connecting to the WAN in a cableless manner using the function and includes a wireless LAN portion 31 for executing wireless communication with the wireless LAN portion 21 of the tuner box 2.

That is, in the state of the first use example shown in FIG. 1, the tuner box 2 executes information communication with the PC 3 through a wireless communication channel concurrently with information communication with the display device 1 through the wired communication channel via the connector 23. For example, a Web page viewed with a browser operating in the PC 3 can also be displayed on the display device 1. The display device 1 is also provided with a function of simultaneously displaying a plurality of images.

On the other hand, the display device 1 also includes a wireless LAN portion 11 for executing wireless communication with the wireless LAN portion 21 of the tuner box 2. If the display device 1 is attached to the connector 23 of the tuner box 2, wireless communication of the wireless LAN portion 11 are not conducted; however, when the display device 1 is attached, device information assigned to the display device 1 and the tuner box 2, more specifically the MAC (Media Access Control) addresses are transferred between the wireless LAN portion 11 of the display device 1 and the wireless LAN portion 21 of the tuner box 2 and are recorded.

Figure 2:
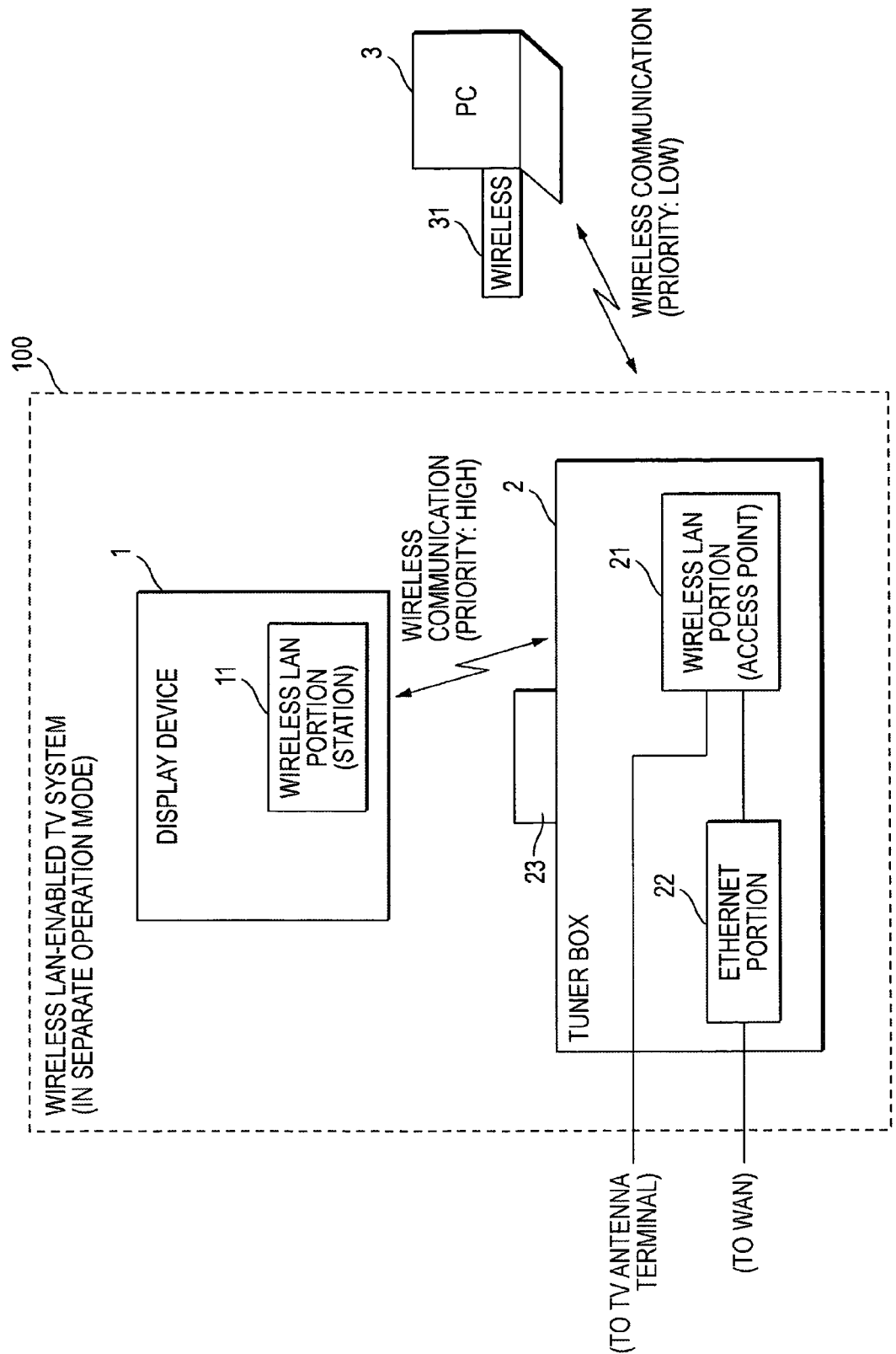
FIG. 2 is an exemplary diagram showing a second use example of the wireless LAN-enabled TV system of the embodiment (in separate operation mode)

FIG. 2 is an exemplary diagram showing a second use example of the wireless LAN-enabled TV system of the embodiment (in separate operation mode).

In the second use example shown in FIG. 2, the display device 1 is detached from the connector 23 of the tuner box 2 to operate in-the separate operation mode. The display device 1 includes the wireless LAN portion 11 for executing wireless communication with the wireless LAN portion 21 of the tuner box 2, as described above. Therefore, in the state of the second use example shown in FIG. 2, the tuner box 2 simultaneously executes both wireless communication with the display device 1 and wireless communication with the PC 3. At this time, the tuner box 2 executes communication control to allow information communication addressed to the wireless LAN portion 11 of the display device 1 to take precedence over information communication addressed to the wireless LAN portion 31 of the PC 3 using the MAC address recorded when the display device 1 is attached.

Accordingly, the user once attaches the display device 1 to the connector 23 of the tuner box 2 and simply operates the display device 1 and the tuner box 2 in the integral operation mode, whereby it is made possible to give a higher priority to the information communication addressed to the display device 1 in the later separate operation mode. Therefore, a higher priority can be easily given to transmission of video information of TV broadcast information requiring the immediacy to the display device 1. Whenever the display device 1 is attached, the MAC address is acquired. Thus, for example, if the user replaces only the display device 1 with another purchased display device because of a failure, the user operates the new display device 1 and the tuner box 2 in the integral operation mode, whereby a higher priority can be given to transmission of video information to the new display device 1 in the later separate operation mode.

Figure 3:
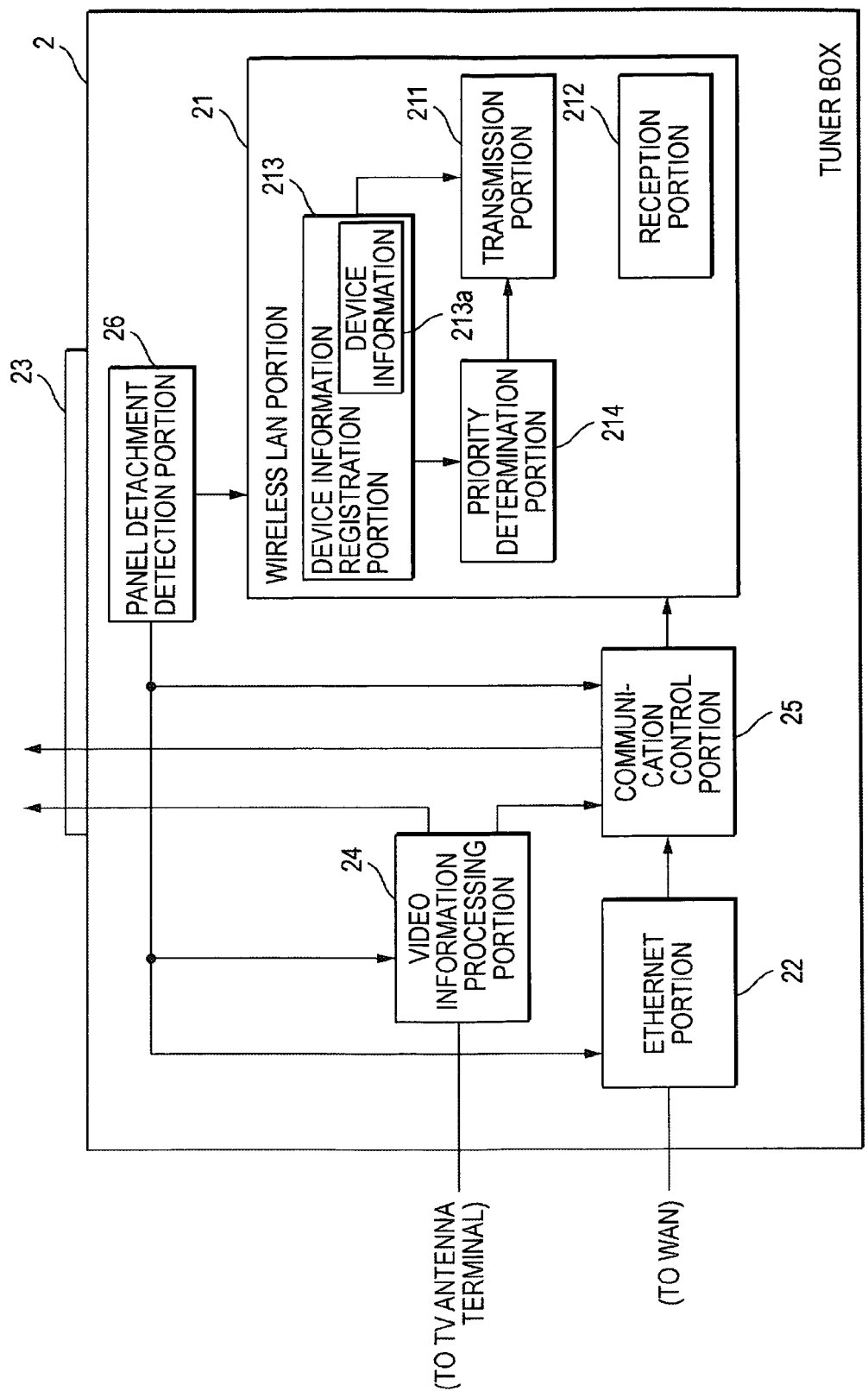
FIG. 3 is an exemplary block diagram showing a configuration of a tuner box applied to the wireless LAN-enabled TV system of the embodiment.

FIG. 3 is an exemplary block diagram showing a configuration of a tuner box 2 of the embodiment. As shown in FIG. 3, the tuner box 2 has a video information processing portion 24, a communication control portion 25, and a panel detachment detection portion 26 as well as the wireless LAN portion 21, the Ethernet portion 22, and the connector 23 shown in FIGS. 1 and 2, and the wireless LAN portion 21 includes a transmission portion 211, a reception portion 212, a device information registration portion 213, and a priority determination portion 214.

The panel detachment detection portion 26 detects whether or not the display device 1 is attached to the connector 23 and sends the detection result to the wireless LAN portion 21, the Ethernet portion 22, the video information processing portion 24, and the communication control portion 25. The detection may be executed using a mechanical switch which is turned on when the display device 1 is attached to the connector 23, for example, or may be executed using an electric circuit for monitoring the state of a signal line which is brought into conduction when the display device 1 is attached to the connector 23, for example. Any existing technique can be applied if it can accomplish the expected purpose of detecting whether or not the display device 1 is attached.

The video information processing portion 24 generates video information from TV broadcast information captured from the TV antenna terminal. Upon reception of the detection result to the effect that the display device 1 is attached from the panel detachment detection portion 26, the video information processing portion 24 directly transmits the generated video information to the display device 1 via the connector 23; on the other hand, upon reception of the detection result to the effect that the display device 1 is detached, the video information processing portion 24 transfers the generated video information to the communication control portion 25.

The communication control portion 25 puts information received from the Ethernet portion 22 into packets so that the information can be transmitted on the wireless communication channel, and transfers the information packets to the wireless LAN portion 21. Upon reception of the detection result to the effect that the display device 1 is detached from the panel detachment detection portion 26, the communication control portion 25 further puts video information transferred from the video information processing portion 24 into packets. When receiving the detection result to the effect that the display device 1 is attached from the panel detachment detection portion 26, the communication control portion 25 executes communication with the display device 1 via the connector 23 for providing the display device 1 with the MAC address assigned to the wireless LAN portion 21 and acquiring the MAC address assigned to the wireless LAN portion 11 of the display device 1. The communication control portion 25 transfers the acquired MAC address to the wireless LAN portion 21.

The wireless LAN portion 21 sends the packet transferred from the communication control portion 25 onto the wireless communication channel, the transmission portion 211 executes the packet transmission, and the reception portion 212 receives the packet addressed to the tuner box 2 from the wireless communication channel. When receiving the detection result to the effect that the display device 1 is attached from the panel detachment detection portion 26, the device information registration portion 213 receives the MAC address transferred from the communication control portion 25 and records the MAC address as device information 213a. The priority determination portion 214 controls the transmission portion 211 to preferentially send the packet addressed to the MAC address recorded in the device information registration portion 213 as the device information 213a. Accordingly, later, when the display device 1 is detached from the connector 23 and the packet addressed to the display device 1 is transferred from the communication control portion 25 to the wireless LAN portion 21, the packet is transmitted preferentially.

Figure 4:
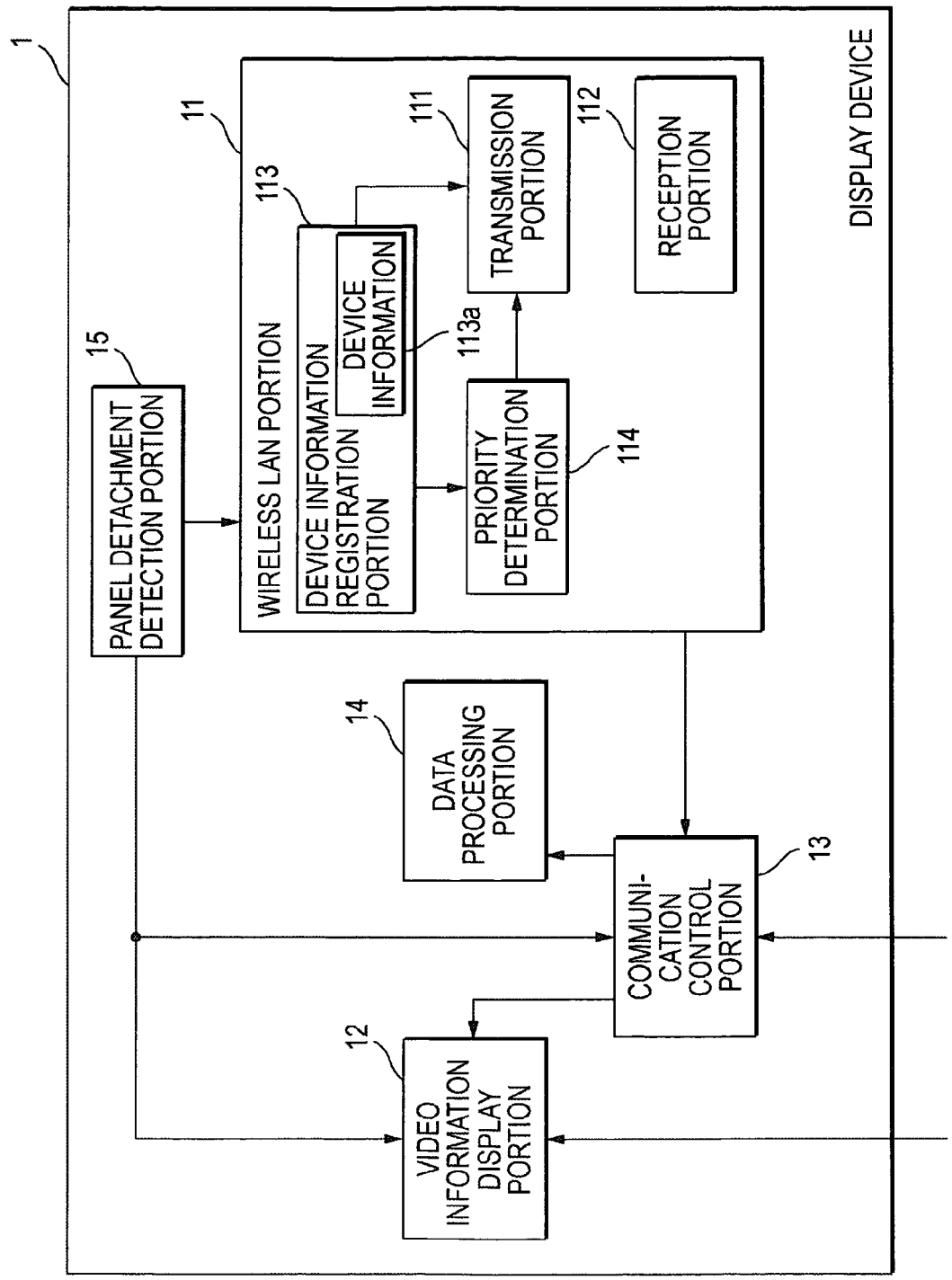
FIG. 4 is an exemplary block diagram showing a configuration of a display device applied to the wireless LAN-enabled TV system of the embodiment.

FIG. 4 is an exemplary block diagram showing a configuration of a display device 1 of the embodiment. As shown in FIG. 4, the display device 1 has a video information display portion 12, a communication control portion 13, a data processing portion 14, and a panel detachment detection portion 15 as well as the wireless LAN portion 11 shown in FIGS. 1 and 2.

The panel detachment detection portion 15 detects whether or not the display device 1 is attached to the connector 23 of the tuner box 2 and sends the detection result to the wireless LAN portion 11, the video information display portion 12, and the communication control portion 13. Upon reception of the detection result to the effect that the display device 1 is attached to the connector 23 from the panel detachment detection portion 15, the video information display portion 12 receives and displays video information transmitted directly from the tuner box 2 via the connector 23; on the other hand, upon reception of the detection result to the effect that the display device 1 is detached from the connector 23, the video information display portion 12 receives and displays video information from the communication control portion 13.

Upon reception of the detection result to the effect that the display device 1 is detached from the connector 23 from the panel detachment detection portion 15, the communication control portion 13 reconstructs the video information put into packets received by the wireless LAN portion 11 and transfers the video information to the video information display portion 12. When receiving the detection result to the effect that the display device 1 is attached to the connector 23 from the panel detachment detection portion 15, the communication control portion 13 executes communication with the tuner box 2 via the connector 23 for providing the tuner box 2 with the MAC address assigned to the wireless LAN portion 11 and acquiring the MAC address assigned to the wireless LAN portion 21 of the tuner box 2. The communication control portion 13 transfers the acquired MAC address to the wireless LAN portion 11. The wireless LAN portion 11 operates in the same manner as the wireless LAN portion 21 of the tuner box 2 described above.

That is, the display automatically switches between the mode in which when the display device 1 is attached to the connector 23 of the tuner box 2, the display device 1 receives the video information from the tuner box 2 through the wired communication channel and the mode in which when the display device 1 is detached from the connector 23 of the tuner box 2, the display device 1 receives the video information from the tuner box 2 through the wireless communication channel. Further, when the display device 1 is attached to the connector 23 of the tuner box 2, the display device 1 transmits the MAC address of the wireless LAN portion 11 to the tuner box 2 so that the packet addressed to the display device 1 is preferentially sent later when the display device 1 is detached from the connector 23 and receives video information through the wireless communication channel.

The display device 1 can display a Web page of the Internet, etc., for example, as described above. The data processing portion 14 executes data processing, etc., to interpret HTML of the Web page, for example, and generate video information.

When the display device 1 and the tuner box 2 are separated and operate in the separate operation mode and the display device 1 simultaneously displays video information of TV broadcast and a Web page of the Internet, etc., the communication control portion 25 of the tuner box 2 performs processing of putting both information from the Ethernet portion 22 and video information from the video information processing portion 24 into packets and transferring the packets to the wireless LAN portion 21. To preferentially transmit only the video information from the video information processing portion 24 requiring the immediacy, the communication control portion 25 further executes the following processing.

The communication control portion 25 previously acquires the MAC address of the wireless LAN portion 21. When video information is transferred from the video information processing portion 24 after the detection result to the effect that the display device 1 is detached from the panel detachment detection portion 26 is received, the communication control portion 25 gives the previously acquired MAC address of the wireless LAN portion 21 only to the packet of the video information from the video information processing portion 24 as attribute information. The wireless LAN portion 21 checks whether or not the MAC address of the wireless LAN portion 21 is given to the packet transferred from the communication control portion 25 as attribute information. If the MAC address of the wireless LAN portion 21 is given to the packet, the wireless LAN portion 21 applies the priority control to the packet.

Accordingly, it is further made possible to preferentially transmit only the video information in the information communication through the wireless communication channel between the display device 1 and the tuner box 2.

Figure 5:
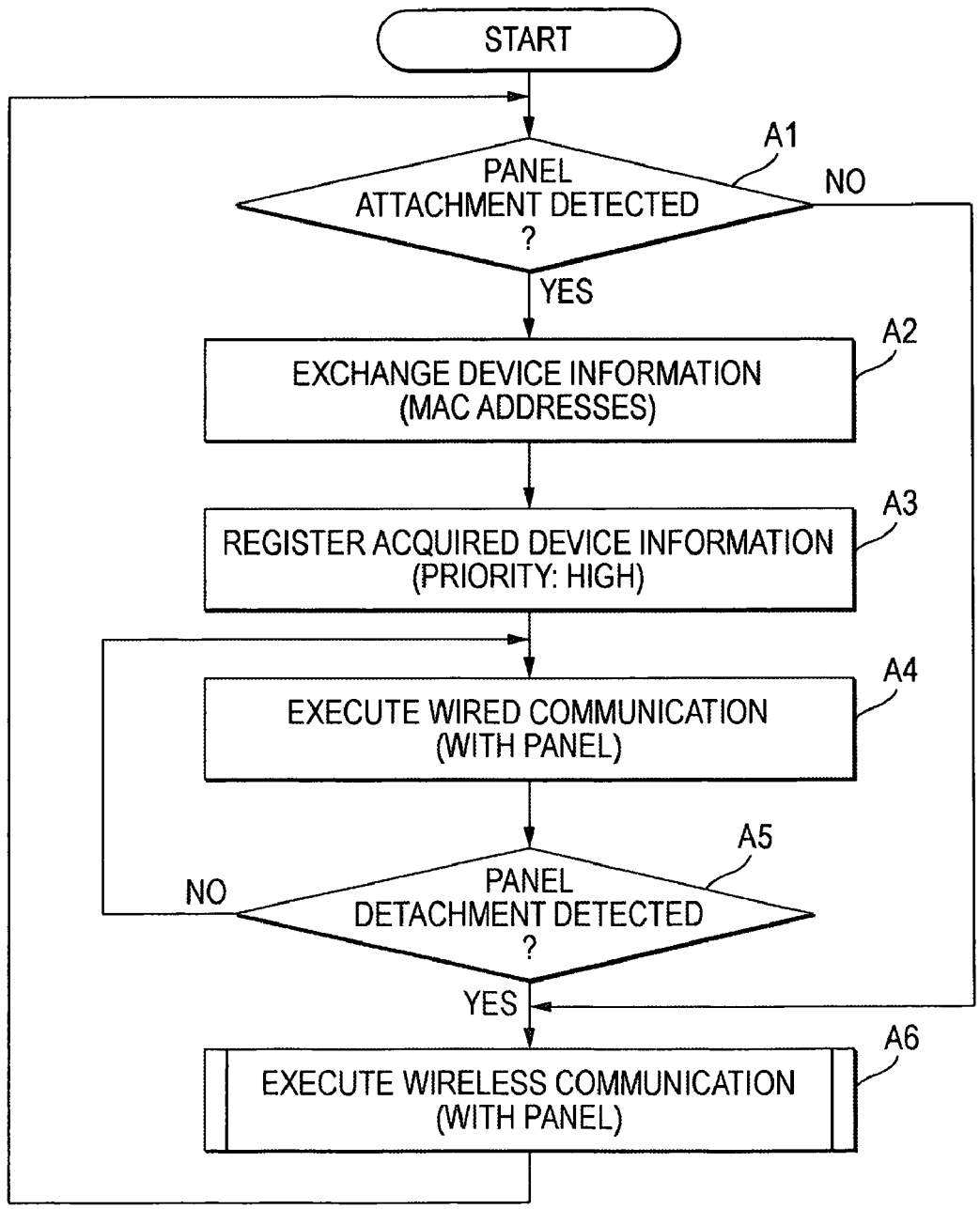
FIG. 5 is an exemplary flowchart showing the operation procedure of the tuner box applied to the wireless LAN-enabled TV system of the embodiment.

FIG. 5 is an exemplary flowchart showing the operation procedure of the tuner box 2 of the embodiment.

The communication control portion 25 first checks whether or not the panel detachment detection portion 26 detects that the display device 1 is attached (block A1). When the panel detachment detection portion 26 detects that the display device 1 is attached (YES at block A1), the communication control portion 25 exchanges the MAC addresses assigned to the wireless LAN portions with the attached display device 1 (block A2) and registers the acquired MAC address of the wireless LAN portion of the display device 1 (block A3). The video information processing portion 24 executes wired communication with the attached display device 1 (block A4).

Figure 6:
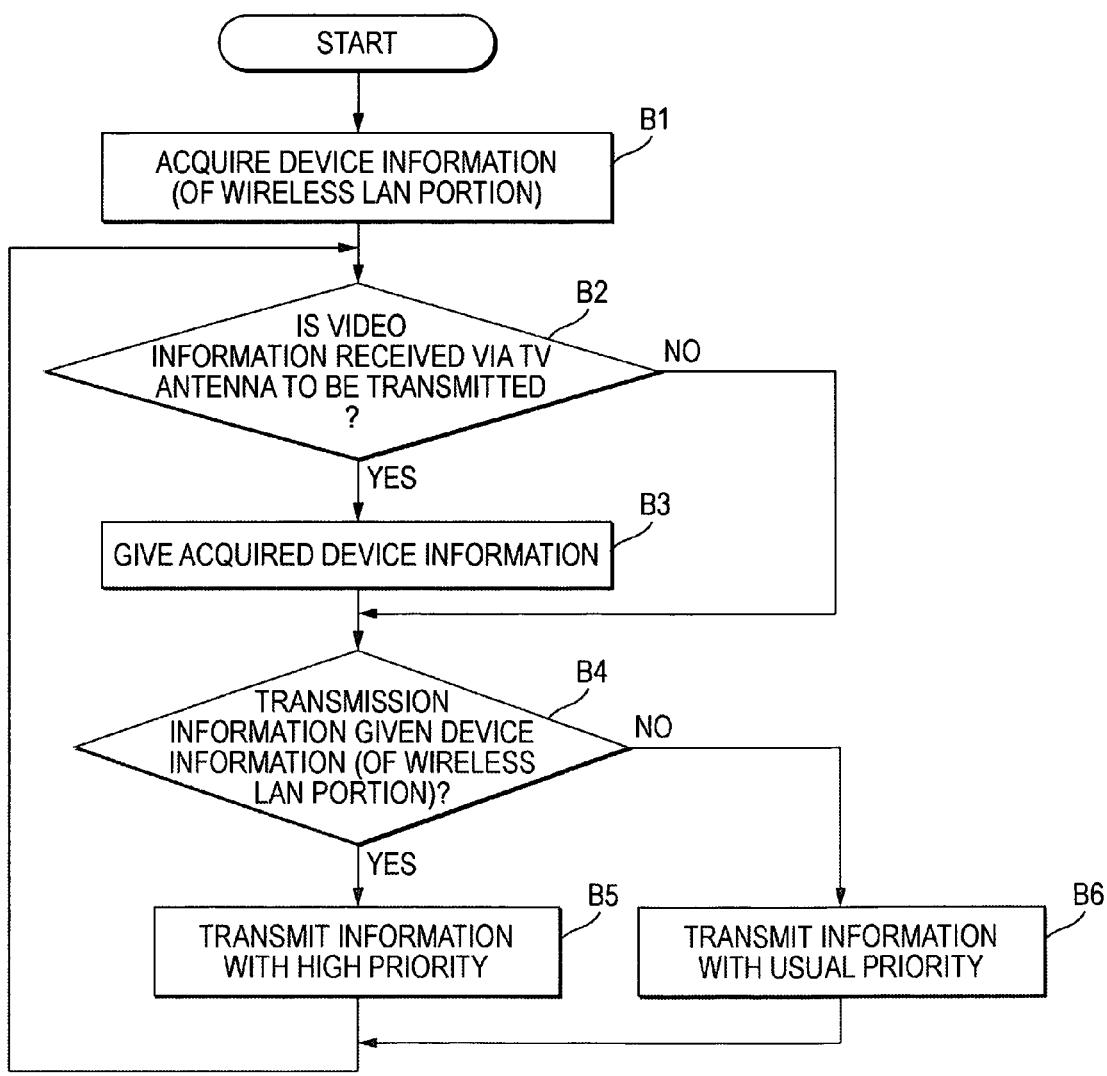
FIG. 6 is an exemplary flowchart showing the detailed operation procedure of wireless communication with the display device executed by the tuner box applied to the wireless LAN-enabled TV system of the embodiment.

Next, the communication control portion 25 checks whether or not the panel detachment detection portion 26 detects that the display device 1 is detached (block A5). When the panel detachment detection portion 26 detects that the display device 1 is detached (YES at block A5), the communication control portion 25 executes wireless communication with the display device 1. FIG. 6 is an exemplary flowchart showing the detailed operation procedure of wireless communication.

In the wireless communication with the display device 1, the communication control portion 25 first acquires the MAC address of the wireless LAN portion 21 (block B1). The communication control portion 25 checks whether or not the information to be transmitted by the wireless LAN portion 21 is video information received from the video information processing portion 24 (block B2). When the information is video information from the video information processing portion 24 (YES at block B2), the communication control portion 25 gives the acquired MAC address (block B3).

The wireless LAN portion 21 checks whether or not the transmission information received from the communication control portion 25 is given the MAC address of the wireless LAN portion 21 (block B4). When the transmission information is given the MAC address (YES at block B4), the wireless LAN portion 21 transmits the information with high priority (block B5); on the other hand, when the transmission information is not given the MAC address (NO at block B4), the wireless LAN portion 21 transmits the information with usual priority (block B6).

As described above, according to the wireless LAN—enabled TV system 100 of the embodiment, the user once attaches the display device 1 to the connector 23 of the tuner box 2 and simply operates the display device 1 and the tuner box 2 in the integral operation mode, whereby it is made possible to give a higher priority to the wireless communication concerning the video information between the display device 1 and the tuner box 2.

It is to be understood that the present invention is not limited to the specific embodiment described above and that the invention can be embodied with the elements modified without departing from the spirit and scope of the invention. The present invention can be embodied in various forms according to appropriate combinations of the elements disclosed in the embodiment described above. For example, some elements may be deleted from all elements shown in the embodiment. Further, the elements in different embodiments may be used appropriately in combination.

What is claimed is:

1. An electronic device system comprising:
   a display device; and
   an electronic device to and from which the display device can be attached and detached,
   wherein the display device includes:
   a display screen which displays a video based on video information sent from the electronic device;
   a first detection unit which detects whether the display device is attached to the electronic device;

a first wireless communication unit which receives the video information via a wireless communication channel when the first detection unit detects that the display device is detached from the electronic device;

a first wired communication unit which receives the video information via a wired communication channel, when the first detection unit detects that the display device is attached to the electronic device; and a control unit which transmits device information assigned to the first wireless communication unit to the electronic device via the wired communication channel when the first detection unit detects that the display device is attached to the electronic device, and wherein the electronic device includes:

a video processing unit which receives television broadcast information and generates the video information based on the television broadcast information;

a network connecting unit connected to a wide area network (WAN);

a second detection unit which detects whether the display device is attached to the electronic device;

a second wireless communication unit which simultaneously performs a plurality of information communications, the information communications including transmission of the video information to the display device and connection to the WAN from an external electronic device;

a second wired communication unit which transmits the video information to the display device via the wired communication channel when the second detection unit detects that the display device is attached to the electronic device;

an acquisition unit which includes a device information registration portion, and acquires the device information assigned to the first wireless communication unit via the wired communication channel from the display device to write the device information into the device information registration portion when the second detection unit detects that the display device is attached to the electronic device; and a communication control unit which controls the second wireless communication unit to perform the transmission of the video information to the display device with a higher priority as compared to the connection to the WAN, when the device information constitutes the data most recently written into the device information registration portion.

2. The electronic device system according to claim 1, wherein the device information includes a MAC (Media Access Control) address.

3. The electronic device system according to claim 2, wherein, the second wireless communication unit has a storage portion for storing the MAC address, and when the MAC address is acquired, the communication control unit updates the MAC address stored in the storage portion of the second wireless communication unit to the acquired MAC address.

4. The electronic device system according to claim 1, wherein:

the second communication control unit adds the device information assigned to the second wireless communication unit to the video information generated by the video processing unit and inputs the information to the second wireless communication unit, and the second wireless communication unit preferentially transmits only the video information to which the device information assigned to the second wireless communication unit is added.

5. An electronic device system comprising:

a display device; and an electronic device to and from which the display device can be attached and detached, wherein the display device includes:

a display screen which displays a video based on video information sent from the electronic device;

a first detection unit which detects whether the display device is attached to the electronic device;

a first wireless communication unit which receives the video information via a wireless communication channel when the first detection unit detects that the display device is detached from the electronic device; and a first wired communication unit which receives the video information via a wired communication channel, when the first detection unit detects that the display device is attached to the electronic device, and wherein the electronic device includes:

a video processing unit which receives television broadcast information and generates the video information based on the television broadcast information;

a network connecting unit connected to a wide area network (WAN);

a second detection unit which detects whether the display device is attached to the electronic device;

a second wireless communication unit which simultaneously performs a plurality of information communications, the information communications including transmission of the video information to the display device and connection to the WAN from an external electronic device; and a second wired communication unit which transmits the video information to the display device via the wired communication channel when the second detection unit detects that the display device is attached to the electronic device; and a communication control unit which controls the second wireless communication unit to perform the transmission of the video information to the display device with a higher priority as compared to the connection to the WAN, when device information of the display device constitutes the data most recently written into the device information registration portion.

6. An electronic device to and from which a display device can be attached and detached, the electronic device comprising:

a video processing unit which receives television broadcast information and generates the video information based on the television broadcast information;

a network connecting unit connected to a wide area network (WAN);

a detection unit which detects whether the display device is attached to the electronic device;

a wireless communication unit which simultaneously performs a plurality of information communications, the information communications including transmission of the video information to the display device and connection to the WAN from an external electronic device;

a wired communication unit which transmits the video information to the display device via a wired communication channel when the detection unit detects that the display device is attached to the electronic device;

an acquisition unit which includes a device information registration portion, and acquires device information assigned to the display device via the wired communication channel from the display device when the detection unit detects that the display device is attached to the electronic device; and a communication control unit which controls the wireless communication unit to perform the transmission of the video information to the display device with a higher priority as compared to the connection to the WAN, when the device information constitutes the data most recently written into the device information registration portion.

7. The electronic device according to claim 6, wherein the device information includes a MAC (Media Access Control) address.

8. The electronic device according to claim 7, wherein the wireless communication unit has a storage portion for storing the MAC address, and wherein, when the MAC address is acquired, the communication control unit updates the MAC address stored in the storage portion of the wireless communication unit to the acquired MAC address.

9. The electronic device according to claim 6, wherein:

the communication control unit adds the device information assigned to the wireless communication unit to the video information generated by the video processing unit and inputs the information to the wireless communication unit, and the wireless communication unit preferentially transmits only the video information to which the device information assigned to the electronic device is added.

10. A display device that can be attached to and detached from an electronic device, the display device comprising:

a display screen which displays a video based on video information sent from the electronic device;

a detection unit which detects whether the display device is attached to the electronic device;

a first wireless communication unit which receives the video information via a wireless communication channel when the detection unit detects that the display device is detached from the electronic device;

a wired communication unit which receives the video information via a wired communication channel, when the detection unit detects that the display device is attached to the electronic device; and a control unit which transmits device information assigned to the wireless communication unit to the electronic device via the wired communication channel when the detection unit detects that the display device is attached to the electronic device;

wherein the electronic device simultaneously performs a plurality of information communications including transmission of the video information to the display device and connection to a wide area network (WAN) from an external electronic device; and the electronic device includes:

an acquisition unit which includes a device information registration portion, and acquires the device information via the wired communication channel a second wireless communication unit; and a communication control unit which controls the second wireless communication unit to perform the transmission of the video information to the display device with a higher priority as compared to the connection to the WAN, when the device information constitutes the data most recently written into the device information registration portion.

11. The display device according to claim 10, wherein the device information includes a MAC (Media Access Control) address.

12. A communication control method for use in an electronic device system, the system including a display device and an electronic device to and from which the display device can be attached and detached, the method comprising:

detecting at the display device whether the display device is attached to the electronic device;

transmitting device information, assigned to the display device, from the display device to the electronic device via a wired communication channel, when it is detected that the display device is attached to the electronic device;

detecting at the electronic device whether the display device is attached to the electronic device;

acquiring the device information assigned to the display device via the wired communication channel from the display device when it is detected that the display device is attached to the electronic device;

writing the device information into a device information registration portion; and controlling information communication via a wireless communication channel to conduct a first information communication addressed to the acquired device information with a high priority relative to the priority of a second information communication, when the device information constitutes the data most recently written into the device information registration portion.

* * * * *